United States Patent
Miyairi et al.

(10) Patent No.: US 9,487,448 B2
(45) Date of Patent: Nov. 8, 2016

(54) HONEYCOMB STRUCTURE

(71) Applicant: NGK Insulators, Ltd., Nagoya (JP)

(72) Inventors: Yukio Miyairi, Nagoya (JP); Yoshio Kikuchi, Nagoya (JP); Takafumi Kimata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/643,050

(22) Filed: Mar. 10, 2015

(65) Prior Publication Data

US 2015/0266779 A1    Sep. 24, 2015

Related U.S. Application Data

(60) Provisional application No. 61/954,770, filed on Mar. 18, 2014.

(30) Foreign Application Priority Data

Feb. 19, 2015  (JP) .................... 2015-030868

(51) Int. Cl.
*B01D 46/24* (2006.01)
*C04B 35/565* (2006.01)
(Continued)

(52) U.S. Cl.
CPC ......... *C04B 35/565* (2013.01); *B01D 39/2075* (2013.01); *B01D 46/2418* (2013.01); *B01D 46/2429* (2013.01); *B01J 35/04* (2013.01); *C04B 35/6316* (2013.01); *C04B 38/0006* (2013.01); *F01N 3/0222* (2013.01); *B01D 2046/2433* (2013.01); *C04B 2111/00793* (2013.01); *C04B 2235/3218* (2013.01); *C04B 2235/349* (2013.01); *C04B 2235/428* (2013.01); *C04B 2235/5409* (2013.01); *C04B 2235/5436* (2013.01); *C04B 2235/5445* (2013.01); *C04B 2235/80* (2013.01); *C04B 2235/9607* (2013.01); *Y10T 428/24149* (2015.01)

(58) Field of Classification Search
None
See application file for complete search history.

(56) References Cited

U.S. PATENT DOCUMENTS 7,273,649 B2    9/2007 Miwa
8,257,660 B2    9/2012 Ogyu et al.
(Continued)

FOREIGN PATENT DOCUMENTS

| DE | 603 08 158 T2 | 9/2007 |
|---|---|---|
| DE | 20 2010 018 032 U1 | 11/2013 |
| JP | 06-182228 A1 | 7/1994 |
| JP | 2002-201082 A1 | 7/2002 |
| JP | 4307781 B2 | 8/2009 |
| JP | 4426459 B2 | 3/2010 |

OTHER PUBLICATIONS

German Office Action (With English Translation), German Application No. 10 2015 003 218.6, dated Oct. 13, 2015 (7 pages).

*Primary Examiner* — David Sample
*Assistant Examiner* — Nicholas W Jordan
(74) *Attorney, Agent, or Firm* — Burr & Brown, PLLC

(57) ABSTRACT

A honeycomb structure including a pillar-shaped honeycomb structure body having partition walls defining a plurality of cells which become through channels for a fluid and extend from a first end face to a second end face, the partition walls include a porous body having refractory aggregates and a bonding material which bonds the refractory aggregates to each other, the bonding material includes metal Si and an oxide material, porosity of the porous body constituting the partition walls is 25% or more and 70% or less, a ratio of a mass of the bonding material to a mass of the whole porous body is 30 mass % or more and 50 mass % or less, and a ratio of a mass of the oxide material to the mass of the bonding material is 30 mass % or more and 80 mass % or less.

8 Claims, 2 Drawing Sheets

(51) Int. Cl.
*B01D 39/20* (2006.01)
*B01J 35/04* (2006.01)
*F01N 3/022* (2006.01)
*C04B 35/63* (2006.01)
*C04B 38/00* (2006.01)
*C04B 111/00* (2006.01)

(56) References Cited

U.S. PATENT DOCUMENTS

| | | |
|---|---|---|
| 2003/0134084 A1 | 7/2003 | Ichikawa et al. |
| 2004/0033893 A1 | 2/2004 | Tomita et al. |
| 2005/0095395 A1 | 5/2005 | Miwa |
| 2006/0029768 A1 | 2/2006 | Furukawa et al. |
| 2011/0085940 A1 | 4/2011 | Ogyu et al. |

HONEYCOMB STRUCTURE

The present application is an application based on U.S. provisional application Ser. No. 61/954,770 filed with U.S. Patent and Trademark Office on Mar. 18, 2014, and based on JP-2015-30868 filed with Japan Patent Office on Feb. 19, 2015, the entire contents of which are incorporated herein by reference.

BACKGROUND OF THE INVENTION

1. Field of the Invention

The present invention relates to a honeycomb structure, and more particularly, it relates to a honeycomb structure which has a high strength, a large heat capacity and a large thermal conductivity and is therefore hard to be damaged even during use at high temperatures.

2. Description of Related Art

A honeycomb structure is broadly used as a filter which traps particulate matter included in a dust-containing fluid such as an exhaust gas discharged from a diesel engine and removes the particulate matter from the exhaust gas, or a catalyst carrier onto which a catalyst to purify harmful substances ($NO_x$, and the like) in the exhaust gas is to be loaded. In addition, it is known that for the purpose of using such a honeycomb structure under an environment exposed to a high-temperature exhaust gas, refractory particles such as silicon carbide particles are used as a constituent material of the honeycomb structure.

For example, in Patent Document 1, a catalyst carrier is disclosed which is obtained by using silicon carbide (SiC) powder as a starting material, forming this material into a desirable shape and drying the material, followed by firing in a temperature range of 1600 to 2200° C. However, for the catalyst carrier described in Patent Document 1, the very high firing temperature is required, and hence cost is high. In addition, silicon carbide having a high thermal expansion coefficient is fired at the high temperature, and hence, for example, a problem that a firing yield is low is involved sometimes. Additionally, in Patent Document 2, as a honeycomb structure which can inexpensively be manufactured at a comparatively low firing temperature, a honeycomb structure including silicon carbide particles (SiC) and metal silicon (Si) is disclosed. However, as to the honeycomb structure described in Patent Document 2, wettability of silicon carbide to metal silicon is not sufficiently obtained, the honeycomb structure cannot be provided with high strength, and a thermal conductivity of the honeycomb structure is not sufficiently obtained. Therefore, for example, a problem that the honeycomb structure is damaged due to thermal stress is involved sometimes.

Furthermore, in Patent Documents 3 and 4, technologies for an improvement to solve the abovementioned problems of the catalyst carrier and the honeycomb structure are disclosed. That is, in Patent Document 3, a silicon carbide porous body is disclosed which includes silicon carbide particles (SiC) and metal silicon (Si) and in which surfaces or peripheries of the silicon carbide particles and/or metal silicon particles include an alkali earth metal or the like. Additionally, in Patent Document 4, a silicon carbide porous body is disclosed in which silicon carbide particles (SiC) and metal silicon (Si) are bonded in a state where pores are held and part of micropores among the pores has a phase of strontium oxide or the like. Further, according to such constitutions, the wettability of silicon to silicon carbide improves, a contact area between a silicon interface and a silicon carbide interface increases, strength and a thermal conductivity of the silicon carbide porous body improve, and the silicon carbide porous body is hard to be damaged even during use at high temperatures.

[Patent Document 1] JP-A-H06-182228
[Patent Document 2] JP-A-2002-201082
[Patent Document 3] JP-B-4307781
[Patent Document 4] JP-B-4426459

SUMMARY OF THE INVENTION

However, in the inventions described in each of Patent Documents 3 and 4 in which metal silicon is used as a bonding material between a silicon carbide particle and another silicon carbide particle, a problem that wettability of metal silicon is insufficient is still present sometimes. Furthermore, for example, a problem that a honeycomb structure cannot have high strength is not still solved because the wettability of metal silicon is insufficient, and a problem that the honeycomb structure is damaged due to thermal stress is still unsolved because a thermal conductivity of the honeycomb structure is insufficient. In addition, a heat capacity of metal silicon is about half as large as that of silicon carbide, and hence when particulate matter deposited in a filter (the honeycomb structure) is burnt to regenerate the filter, a temperature of the filter excessively heightens sometimes. Furthermore, a thermal expansion coefficient is large, and hence when the temperature of the filter heightens during the regeneration of the filter, the filter is damaged due to large thermal stress generated in the filter, and the particulate matter leaks from a damaged portion sometimes.

The present invention has been developed in view of such problems. According to the present invention, there is provided a honeycomb structure which has high strength, a large heat capacity and a large thermal expansion coefficient and is therefore hard to be damaged even during use at high temperatures.

According to the present invention, a honeycomb structure described as follows is provided.

According to a first aspect of the present invention, a honeycomb structure including a pillar-shaped honeycomb structure body having partition walls defining a plurality of cells which become through channels for a fluid and extend from a first end face to a second end face is provided, wherein the partition walls include a porous body having refractory aggregates and a bonding material which bonds the refractory aggregates to each other, the bonding material includes metal Si and an oxide material, porosity of the porous body constituting the partition walls is 25% or more and 70% or less, a ratio of a mass of the bonding material to a mass of the whole porous body is 30 mass % or more and 50 mass % or less, and a ratio of a mass of the oxide material to the mass of the bonding material is 30 mass % or more and 80 mass % or less.

According to a second aspect of the present invention, the honeycomb structure according to the above first aspect is provided, wherein the porosity of the porous body is 25% or more and 55% or less, the ratio of the mass of the oxide material to the mass of the whole porous body is 26 mass % or more and 40 mass % or less, and a thermal conductivity at 800° C. is 5 W/(m·K) or more and 28 W/(m·K) or less.

According to a third aspect of the present invention, the honeycomb structure according to the above first or second aspects is provided, wherein the porosity of the porous body is 25% or more and 32% or less.

According to a fourth aspect of the present invention, the honeycomb structure according to any one of the above first to third aspects is provided, wherein the oxide material includes, as a main component, an oxide including at least one metal element selected from a group consisting of Al, Si and Mg or a mixture including two or more types of the oxides.

According to a fifth aspect of the present invention, the honeycomb structure according to any one of the above first to fourth aspects is provided, wherein a heat capacity at 800° C. is 2.5 J/(cc·K) or more.

A honeycomb structure of the present invention is hard to be damaged due to thermal stress during regeneration of a filter in a case where the honeycomb structure is used as the filter to collect particulate matter (hereinafter simply referred to as the "PM" sometimes). Additionally, in the honeycomb structure of the present invention, as compared with a conventional honeycomb structure, strength of a bonding neck portion which is a portion bonding refractory aggregates to each other improves, and hence strength of the honeycomb structure is high. Furthermore, the honeycomb structure of the present invention has a lower porosity than the conventional honeycomb structure for the purpose of improving the strength of the bonding neck portion which is the portion bonding the refractory aggregates to each other, but the honeycomb structure has less pores through which an exhaust gas does not pass, and therefore has a low pressure loss. Hereinafter, "the honeycomb structure for use as the PM trapping filter" will simply be referred to as "a honeycomb filter" sometimes.

More specifically, the honeycomb structure of the present invention includes a honeycomb structure body having partition walls, and the partition walls include a porous body having refractory aggregates and a bonding material which bonds the refractory aggregates to each other. Furthermore, porosity of the porous body constituting the partition walls is 25% or more and 70% or less. In addition, the bonding material includes metal Si and an oxide material, a ratio of a mass of the bonding material to a mass of the whole porous body is 30 mass % or more and 50 mass % or less, and a ratio of a mass of the oxide material to the mass of the bonding material is 30 mass % or more and 80 mass % or less. Furthermore, according to such a constitution, a maximum temperature $T_{max}$ of the honeycomb filter during the regeneration of the honeycomb filter can be lower than that of a conventional honeycomb filter. That is, the bonding material of the porous body has the above constitution, the partition walls have the above porosity, and both of a heat capacity and a thermal conductivity of the honeycomb structure of the present invention are therefore large. Generally, in such a constitution as to enlarge the heat capacity, there is a tendency that the thermal conductivity is small, but in the honeycomb structure of the present invention, the abovementioned constitution keeps the thermal conductivity large while enlarging the heat capacity. When the honeycomb structure of the present invention and the conventional honeycomb filter are placed at the same high temperature during the regeneration of the honeycomb filter, the maximum temperature of the honeycomb structure of the present invention in which the heat capacity is large is lower than that of the conventional honeycomb filter. Therefore, in the honeycomb structure of the present invention, the thermal stress generated in the whole honeycomb structure is small, and the honeycomb structure is hard to be damaged. Additionally, in the honeycomb structure of the present invention, the thermal conductivity is also large, and hence cracks can effectively be inhibited from being generated in a part of the honeycomb structure due to a local temperature rise. Further, in the honeycomb structure of the present invention, the porosity of the porous body has the abovementioned value, and the ratio of the bonding material has the abovementioned value. Therefore, the bonding neck portion is thicker than that of the conventional honeycomb filter, and hence the strength of the honeycomb structure is high. "The bonding neck portion" means "a bonding portion among refractory aggregate particles". Furthermore, the honeycomb structure of the present invention has a smaller porosity than a conventional high-porosity honeycomb structure. In general, there is a tendency that when the porosity is small, the pressure loss heightens. However, in the honeycomb structure of the present invention, there are less non-usable pores through which the exhaust gas does not pass, and almost all the pores become usable pores through which the exhaust gas passes, so that an initial pressure loss and a pressure loss during PM deposition are small. The usable pores are pores having at least part thereof opened in the surfaces of the partition walls, and are open pores penetrated by mercury when the porosity is measured with a mercury porosimeter. The non-usable pores are pores which are not opened in the surfaces of the partition walls, and are closed pores which are not penetrated by the mercury when the porosity is measured with the mercury porosimeter.

DESCRIPTION OF THE PREFERRED EMBODIMENTS

Hereinafter, embodiments of the present invention will be described, but the present invention is not limited to the following embodiments. Therefore, it should be understood that the following embodiments to which changes, improvements and the like are suitably added on the basis of ordinary knowledge of a person skilled in the art without departing from the gist of the present invention also fall in the scope of the present invention.

(1) Honeycomb Structure

Figure 1:
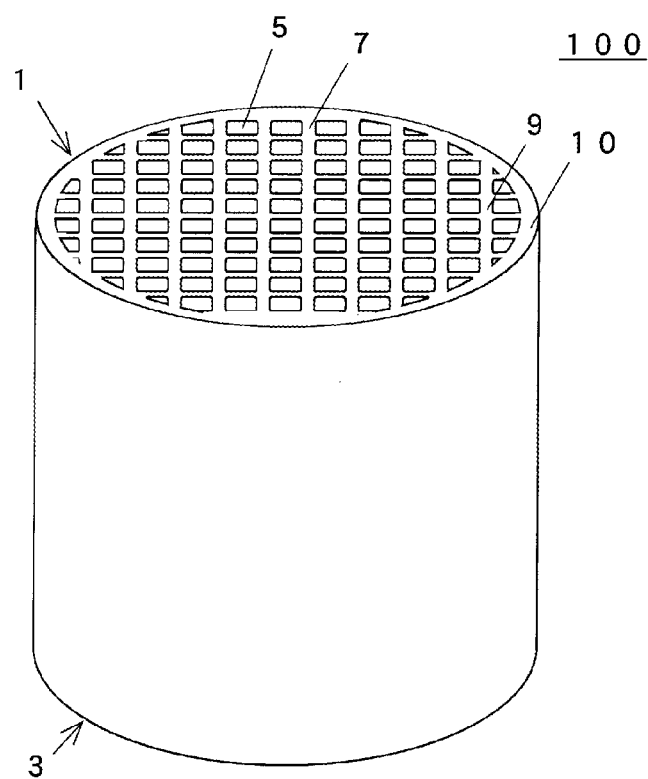
FIG. 1 is a perspective view schematically showing one embodiment of a honeycomb structure of the present invention and seen from an inflow end face side.

One embodiment of a honeycomb structure of the present invention is such a honeycomb structure 100 as shown in FIG. 1. FIG. 1 is a perspective view schematically showing one embodiment of the honeycomb structure of the present invention and seen from an inflow end face side.

As shown in FIG. 1, the honeycomb structure 100 of the present embodiment includes a pillar-shaped honeycomb structure body 9 having partition walls 7 defining a plurality of cells 5 which become through channels for a fluid and extend from a first end face 1 to a second end face 3. Furthermore, the partition walls 7 include a porous body having refractory aggregates and a bonding material which bonds the refractory aggregates to each other. Additionally, porosity of the porous body constituting the partition walls 7 of the honeycomb structure body 9 is 25% or more and 70% or less. In addition, the bonding material includes metal Si and an oxide material, a ratio of a mass of the bonding material to a mass of the whole porous body is 30 mass % or more and 50 mass % or less, and a ratio of a mass of the oxide material to the mass of the bonding material is 30 mass % or more and 80 mass % or less. The ratio of the mass of the bonding material included in the mass of the whole porous body can be measured by a method as follows. First, a total mass of a material test piece cut out from the partition walls of the honeycomb structure is measured. Next, the cut material test piece is subjected to fluorescent X-ray analysis, and crystal components are qualitatively grasped. Then, the material test piece is imaged with a scanning type electron microscope, and from an obtained SEM image, a region area ratio of the refractory aggregates in the SEM image is obtained. Furthermore, the ratio of the mass of the refractory aggregates to the total mass of the material test piece is obtained from the obtained region area ratio of the refractory aggregates and a density of refractory aggregate particles which is already known from the result of the fluorescent X-ray analysis. A residual part other than the refractory aggregates in the material test piece is the bonding material, and the ratio of the mass of the bonding material is obtained from the total mass of the material test piece and the ratio of the mass of the refractory aggregates. In addition, a ratio of a mass of an oxide to the mass of the bonding material can be measured by a method as follows. First, a material test piece cut out from the partition walls of the honeycomb structure is subjected to the fluorescent X-ray analysis and crystal components are qualitatively grasped. Next, on the basis of a calibration curve, respective components are quantitatively grasped from the number of counts of the respective crystal components of the fluorescent X-ray analysis. In addition, reference numeral 10 in FIG. 1 is a circumferential wall.

As described above, in the honeycomb structure of the present embodiment, the porosity of the porous body constituting the partition walls, the ratio of the bonding material to the mass of the whole porous body and the ratio of the mass of the oxide material to the mass of the bonding material are predetermined ratios. Therefore, the honeycomb structure of the present embodiment has a large heat capacity and a large thermal conductivity, and hence PM leakage due to thermal stress cracks of the honeycomb structure is hard to be generated during regeneration of a honeycomb filter. In addition, the thermal conductivity is also large, and hence even when a local temperature rise occurs in the honeycomb structure, cracks can effectively be inhibited from being generated in a part of the honeycomb structure. Furthermore, a bonding neck portion, which is a bonding portion between a refractory aggregate particle and another refractory aggregate particle, is thicker than that of a conventional honeycomb filter, and hence strength of the honeycomb structure is high.

Figure 2A:
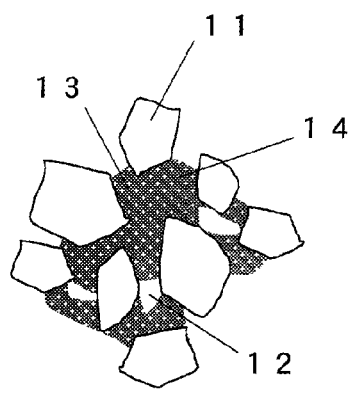
FIG. 2A is a schematic view explaining a microstructure of partition walls in the honeycomb structure of the present invention.
Figure 2B:
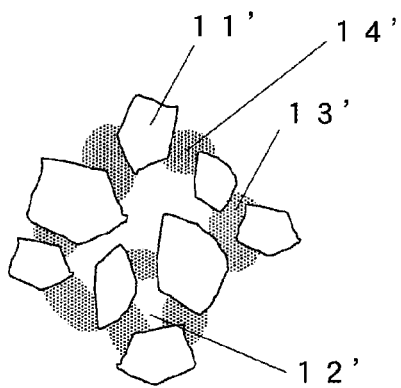
FIG. 2B is a schematic view explaining a microstructure of partition walls in a conventional honeycomb structure.

The refractory aggregates in the honeycomb structure 100 of the present embodiment are bonded to each other by the bonding material. FIG. 2A shows a microstructure of the partition walls in the honeycomb structure of the present invention, and FIG. 2B shows a microstructure of partition walls in a conventional honeycomb structure. As shown in FIG. 2A, refractory aggregates 11 of the honeycomb structure of the present embodiment are bonded to each other by a bonding material 13, and pores 12 are formed between the refractory aggregates 11, between the refractory aggregate 11 and the bonding material 13, and between the bonding materials 13. Furthermore, as shown in FIG. 2B, refractory aggregates 11' of the conventional honeycomb structure are bonded to each other by a bonding material 13', and pores 12' are formed between the refractory aggregates 11', between the refractory aggregate 11' and the bonding material 13', and between the bonding materials 13'. When a bonding neck portion 14 of the honeycomb structure of the present embodiment is compared with a bonding neck portion 14' of the conventional honeycomb structure, the bonding neck portion of the honeycomb structure of the present embodiment is thicker than the bonding neck portion of the conventional honeycomb structure. In consequence, the honeycomb structure of the present embodiment has higher strength than the conventional honeycomb structure.

The partition walls including the porous body in the honeycomb structure of the present embodiment have the refractory aggregates and the bonding material which bonds the refractory aggregates to each other. A ratio of a mass of the refractory aggregates and the bonding material to the mass of the whole porous body is preferably 80 mass % or more and 99 mass % or less, further preferably 90 mass % or more and 99 mass % or less, and especially preferably 95 mass % or more and 99 mass % or less. When the ratio of the mass of the refractory aggregates and the bonding material to the mass of the whole porous body is smaller than 80 mass %, the strength of the honeycomb structure lowers sometimes. The ratio of the mass of the refractory aggregates and the bonding material to the mass of the whole porous body is a value measured by a fluorescent X-ray quantitative analysis.

The bonding material in the honeycomb structure of the present embodiment includes metal Si and an oxide material. A ratio of a mass of metal Si and the oxide material to the mass of the bonding material is preferably 80 mass % or more and 99 mass % or less, further preferably 90 mass % or more and 99 mass % or less, and especially preferably 95 mass % or more and 99 mass % or less. According to such a constitution, wettability of the bonding material to the refractory aggregates improves, and almost all or all pores become usable pores (i.e., opened pores). In addition, a composition of the bonding material is preferably uniform, but there may be present a portion in which the refractory aggregates are locally bonded only by metal Si, or there may be present a portion in which the refractory aggregates are locally bonded only by the oxide material. The ratio of the mass of metal Si and the oxide material to the mass of the bonding material including metal Si and the oxide material is a value measured by the fluorescent X-ray quantitative analysis.

A ratio of the mass of the oxide material to the mass of the bonding material is 30 mass % or more and 80 mass % or less, preferably 30 mass % or more and 60 mass % or less, further preferably 30 mass % or more and 50 mass % or less, and especially preferably 30 mass % or more and 40 mass % or less. According to such a constitution, the heat capacity can be enlarged while keeping the thermal conductivity of the honeycomb structure large. Therefore, when the honeycomb structure is used as a filter, a temperature of the honeycomb structure during the regeneration of the filter can be kept low, and the PM leakage due to the thermal stress cracks does not occur. When the ratio of the mass of the oxide to the mass of the bonding material is smaller than 30 mass %, the ratio of metal Si having a small heat capacity enlarges. Therefore, the heat capacity of the honeycomb structure becomes smaller, the honeycomb structure reaches the high temperature during the regeneration of the filter, and the PM leakage due to the thermal stress cracks easily occurs. In addition, when the ratio of the mass of the oxide to the mass of the bonding material is in excess of 80 mass %, the ratio of metal Si having a large thermal conductivity becomes smaller, so that the thermal conductivity of the honeycomb structure becomes smaller, the honeycomb structure reaches the high temperature during the regeneration of the filter, and the PM leakage due to the thermal stress cracks easily occurs. The ratio of the mass of the oxide material to the mass of the bonding material is a value measured by the fluorescent X-ray quantitative analysis.

A ratio of the mass of the bonding material to the mass of the whole porous body is 30 mass % or more and 50 mass % or less, preferably 30 mass % or more and 45 mass % or less, further preferably 30 mass % or more and 40 mass % or less, and especially preferably 30 mass % or more and 35 mass % or less. When the ratio of the mass of the bonding material to the mass of the whole porous body is smaller than 30 mass %, the refractory particles cannot sufficiently be bonded to each other, and when the ratio is larger than 50 mass %, the porosity of the porous body excessively lowers sometimes.

The porosity of the porous body constituting the partition walls is 25% or more and 70% or less, preferably 25% or more and 55% or less, and further preferably 25% or more and 32% or less. When the porosity is set to this value, the heat capacity and thermal conductivity of the honeycomb structure enlarge, and the maximum temperature of the honeycomb structure during the regeneration of the filter lowers. The value of the porosity is a value measured by a mercury porosimeter.

A ratio of the mass of the oxide material to the mass of the whole porous body is preferably 26 mass % or more and 40 mass % or less, further preferably 26 mass % or more and 35 mass % or less, and especially preferably 26 mass % or more and 30 mass % or less. According to such a constitution, the wettability of the bonding material to the refractory aggregates can improve, and the bonding neck portion can be thickened. In addition, a certain degree of thermal conductivity can be acquired while enlarging the heat capacity of the honeycomb structure. The ratio of the mass of the oxide material to the mass of the whole porous body is a value measured by the fluorescent X-ray quantitative analysis.

A thermal conductivity of the honeycomb structure at 800° C. is preferably 5 W/(m·K) or more and 28 W/(m·K) or less, further preferably 10 W/(m·K) or more and 28 W/(m·K) or less, and especially preferably 20 W/(m·K) or more and 28 W/(m·K) or less. When the thermal conductivity of the honeycomb structure at 800° C. is smaller than 5 W/(m·K), cracks are easily generated in the honeycomb structure sometimes in the case where the local temperature rise occurs in the honeycomb structure. In addition, when the thermal conductivity of the honeycomb structure at 800° C. is larger than 28 W/(m·K), the temperature of the honeycomb structure does not sufficiently heighten, and the PM remains unburnt sometimes during the regeneration of the honeycomb filter. The thermal conductivity at 800° C. is a value measured by a laser flash method.

It is indicated that in the refractory aggregates, a melting point, a sublimation point and a decomposition point are 1300° C. or more at an atmospheric pressure.

Examples of the refractory aggregates include silicon carbide and silicon nitride, but silicon carbide is especially preferable. In addition, an average particle diameter of the refractory aggregates is preferably 5 μm or more and 20 μm or less, further preferably 10 μm or more and 15 μm or less, and especially preferably 10 μm or more and 13 μm or less. When the average particle diameter of the refractory aggregates is smaller than 5 μm, the porosity of the porous body becomes excessively small sometimes, and when the average particle diameter is larger than 20 μm, the porosity of the porous body excessively enlarges sometimes. The average particle diameter is a value measured by laser diffractometry.

The oxide material preferably includes, as a main component, an oxide including at least one metal element selected from a group consisting of Al, Si and Mg or a mixture including two or more types of the oxides. In addition, the oxide material further preferably includes cordierite and mullite as the main components, and especially preferably includes cordierite as the main component. It is to be noted that "the main component" means that a ratio of a mass of the component to the mass of the oxide material is 90 mass % or more, preferably 95 mass % or more and further preferably 98 mass % or more.

A heat capacity of the honeycomb structure at 800° C. is preferably 2.5 J/(cc·K) or more, further preferably 2.5 J/(cc·K) or more and 3.5 J/(cc·K) or less, and especially preferably 2.5 J/(cc·K) or more and 3.0 J/(cc·K) or less. When the heat capacity of the honeycomb structure at 800° C. is smaller than 2.5 J/(cc·K) the honeycomb structure reaches the high temperature and is damaged sometimes during the regeneration of the filter. In addition, when the heat capacity of the honeycomb structure at 800° C. is larger than 3.5 J/(cc·K), the temperature of the honeycomb structure excessively lowers, and the PM deposited in the honeycomb structure cannot completely be burnt (remains unburnt) sometimes during the regeneration of the filter. The heat capacity is a value measured by the laser flash method.

A cell density of the honeycomb structure body is preferably 10 cells/cm$^2$ or more and 54 cells/cm$^2$ or less, further preferably 11 cells/cm$^2$ or more and 48 cells/cm$^2$ or less, and especially preferably 12 cells/cm$^2$ or more and 30 cells/cm$^2$ or less. The cell density of the honeycomb structure body is the number of the cells per unit area in a cross section of the honeycomb structure body which is perpendicular to a cell extending direction. When the cell density is excessively small, PM trapping performance deteriorates, an initial pressure loss enlarges or the thermal conductivity of the honeycomb structure excessively enlarges sometimes. When the cell density is excessively large, the PM is deposited in the vicinity of an inflow end face of a honeycomb substrate, and the cells are closed with the PM. Therefore, the pressure loss enlarges sometimes, and additionally, the thermal conductivity of the honeycomb structure becomes excessively small sometimes.

An average pore diameter of the pores formed in the porous body constituting the partition walls is preferably 7 μm or more and 30 μm or less, further preferably 8 μm or more and 25 μm or less, and especially preferably 9 μm or more and 20 μm or less. When the average pore diameter is excessively small, the pressure loss of the honeycomb structure enlarges sometimes. When the average pore diameter is excessively large, the PM passes through the partition walls without being trapped by the partition walls sometimes. The average pore diameter is a value measured by the mercury porosimeter.

A thickness of the partition walls is preferably 50 μm or more and 800 μm or less, further preferably 100 μm or more and 560 μm or less, and especially preferably 125 μm or more and 350 μm or less. When the thickness of the partition walls is smaller than 50 μm, the strength of the honeycomb structure lowers sometimes, and when the thickness is larger than 800 μm, the initial pressure loss enlarges sometimes. The thickness of the partition walls is a value measured by an optical microscope.

There is not any special restriction on a thickness of the circumferential wall of the honeycomb structure body, but the thickness is preferably 0.3 mm or more and 3 mm or less. When the thickness is smaller than 0.3 mm, lack of cells in the vicinity of the circumferential wall easily occurs, and the strength lowers sometimes. In addition, when the thickness is larger than 3 mm, the pressure loss increases sometimes. In addition, the circumferential wall of the honeycomb structure body may be extruded integrally with the partition walls of the honeycomb structure body, or the circumferential wall may be prepared by applying a circumference coating material.

There is not any special restriction on a shape of the honeycomb structure body (hereinafter referred to simply as "the sectional shape of the honeycomb structure body" sometimes) in a cross section of the honeycomb structure body which is vertical to the cell extending direction. The shape is preferably a polygonal shape such as a triangular, quadrangular, pentangular, hexagonal or octagonal shape, a circular shape, or an elliptic shape, and another intermediate shape is also preferable. In addition, there is not any special restriction on a size of the honeycomb structure body, but a length in the cell extending direction is preferably from 50 to 400 mm. When the length of the honeycomb structure body is in such a range, the honeycomb structure can treat an exhaust gas with an excellent trapping performance without increasing the pressure loss. When the length is shorter than 50 mm, the trapping performance deteriorates sometimes. In addition, when the length is longer than 400 mm, an improvement of the trapping performance can hardly be expected, and instead, the pressure loss increases sometimes. When a balance between the trapping performance and the pressure loss is taken into consideration, the length of the honeycomb structure body is further preferably from 100 to 300 mm, and especially preferably from 120 to 260 mm. Such a constitution is effective when the plurality of honeycomb structures are arranged in series in a can member. A diameter of the bottom surface of the honeycomb structure body is suitably selected from the above range in accordance with an engine displacement or output.

In the honeycomb structure of the present embodiment, a catalyst such as an oxidation catalyst may be loaded onto at least part of the partition walls. Further specifically, the catalyst is preferably loaded onto the partition walls of the honeycomb structure body constituting the honeycomb structure. An amount of the catalyst to be loaded per unit volume of the honeycomb structure is preferably 5 g/cm$^3$ or more and 200 g/cm$^3$ or less, further preferably 5 g/cm$^3$ or more and 150 g/cm$^3$ or less, and especially preferably 5 g/cm$^3$ or more and 120 g/cm$^3$ or less. When the amount is smaller than 5 g/cm$^3$, a catalytic effect is hard to be exerted sometimes. When the amount is larger than 200 g/cm$^3$, the pores of the partition walls are closed to increase the pressure loss, and a trapping efficiency remarkably deteriorates sometimes.

When the catalyst is loaded onto the honeycomb structure of the present embodiment, the catalyst preferably includes one or more selected from a group consisting of a ternary catalyst, an SCR catalyst, an NO$_x$ occluding catalyst, and the oxidation catalyst. The ternary catalyst mainly purifies hydrocarbons (HC), carbon monoxide (CO), and nitrogen oxides (NO$_x$). An example of the ternary catalyst is a catalyst including platinum (Pt), palladium (Pd) and rhodium (Rh). The SCR catalyst selectively reduces components to be purified. Particularly, in a honeycomb catalyst body of the present embodiment, the SCR catalyst is preferably an NO$_x$ selective reducing SCR catalyst which selectively reduces NO$_x$ in the exhaust gas. An example of the NO$_x$ selective reducing SCR catalyst is suitably a catalyst which purifies NO$_x$ in the exhaust gas by the selective reduction. In addition, an example of the SCR catalyst is a metal-substituted zeolite. Examples of a metal for the metal-substituted zeolite include iron (Fe) and copper (Cu). An example of the zeolite is suitably a beta zeolite. In addition, the SCR catalyst may contain, as a main component, at least one selected from a group consisting of vanadium and titania. Examples of the NO$_x$ occluding catalyst include an alkali metal and/or an alkali earth metal. Examples of the alkali metal include potassium, sodium, and lithium. An example of the alkali earth metal is calcium. An example of the oxidation catalyst contains a noble metal. Specifically, the oxidation catalyst preferably contains at least one selected from a group consisting of platinum, vanadium, and rhodium.

Various constitutions hitherto described as the preferable constitutions in the one embodiment are also preferable constitutions in another embodiment and a further embodiment described as follows.

Figure 3:
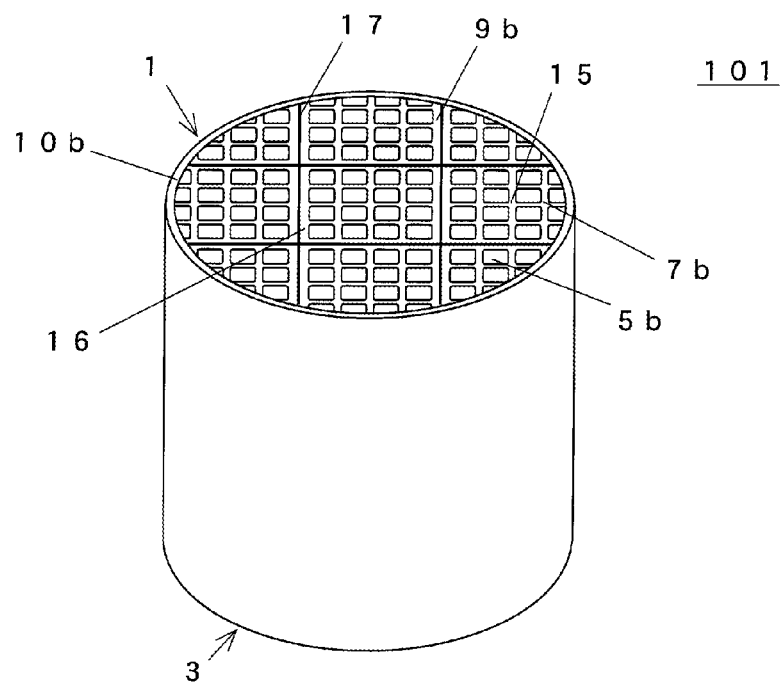
FIG. 3 is a perspective view schematically showing another embodiment of the honeycomb structure of the present invention and seen from an inflow end face side.

Next, the other embodiment of the honeycomb structure of the present invention will be described. The honeycomb structure of the present embodiment is such a honeycomb structure 101 as shown in FIG. 3. FIG. 3 is a perspective view schematically showing the other embodiment of the honeycomb structure of the present invention and seen from an inflow end face side. In FIG. 3, constitutional elements similar to those of the honeycomb structure of the first embodiment are denoted with the same reference numerals, and the description thereof is omitted.

As shown in FIG. 3, in the honeycomb structure 101 of the other embodiment, a honeycomb structure body 9b has a plurality of pillar-shaped honeycomb segments 15 each having an outer wall 16. Furthermore, the honeycomb structure 101 includes the honeycomb structure body 9b of a segmented structure in which the plurality of honeycomb segments 15 are bonded by a bonding portion 17 in a state where the honeycomb segments 15 are arranged adjacent to each other so that side surfaces thereof face each other. Each of the honeycomb segments 15 has porous partition walls 7b including a porous body defining a plurality of cells 5b which extend from a first end face 1 to a second end face 3 and become through channels for a fluid, and the outer wall 16 disposed to surround the partition walls 7b. The bonding portion 17 is disposed so that the outer walls 16 of the honeycomb segments 15 disposed adjacent to each other are bonded to each other. The bonding portion 17 may function as a buffer agent to buffer thermal stress generated in the honeycomb structure body 9b. In the honeycomb structure 101 shown in FIG. 3, a circumferential wall 10b is disposed at an outermost circumference of a bonded body obtained by bonding the plurality of honeycomb segments 15. In the honeycomb structure 101 including the honeycomb structure body 9b of the segmented structure, a portion in which the outer walls 16 of the adjacent honeycomb segments 15 come in contact with each other and the bonding portion 17 are not regarded as the partition walls 7b.

The bonding portion preferably includes SiC particles and alumina fibers so as to enlarge a heat capacity of the honeycomb structure and also enlarge a thermal conductivity to a certain degree. In addition, a bonding portion having a constitution similar to a bonding portion of a honeycomb structure body of a heretofore known segmented structure may be used.

Figure 4:
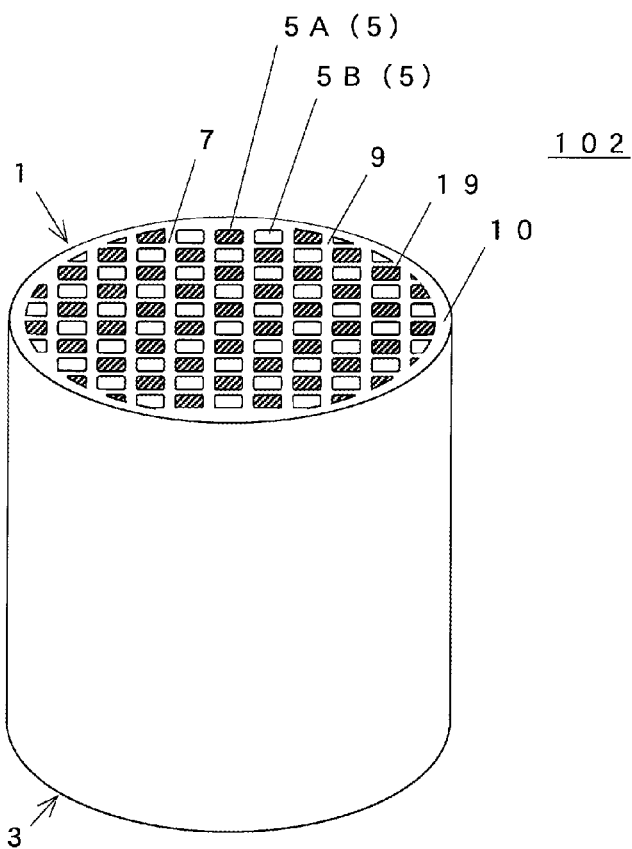
FIG. 4 is a perspective view schematically showing a further embodiment of the honeycomb structure of the present invention and seen from an inflow end face side.

Next, the further embodiment of the honeycomb structure of the present invention will be described. The honeycomb structure of the present embodiment is such a honeycomb structure 102 as shown in FIG. 4. FIG. 4 is perspective view schematically showing the further embodiment of the honeycomb structure of the present invention and seen from an inflow end face side. In FIG. 4, constitutional elements similar to those of the honeycomb structure of the one embodiment are denoted with the same reference numerals, and the description thereof is omitted sometimes.

As shown in FIG. 4, plugging portions 19 can be disposed at open ends of predetermined cells 5A on the side of a first end face 1 and open ends of residual cells 5B on the side of a second end face 3 among a plurality of cells 5 or only at, for example, the open ends of the predetermined cells 5A among the plurality of cells 5 on the side of the first end face 1. When the plugging portions 19 are disposed, it is possible to further enlarge a heat capacity of the honeycomb structure 102 and further enlarge a thermal conductivity thereof.

(2) Manufacturing Method of Honeycomb Structure

Next, a manufacturing method of the honeycomb structure of the present invention will be described. Hereinafter, a method of manufacturing the honeycomb structure of a segmented structure will be described as an example, but the honeycomb structure of the present invention is not limited to the honeycomb structure of the segmented structure.

First, silicon carbide powder which becomes refractory aggregates, bonding material producing raw material powder which becomes a bonding material by firing and an oxide of an alkali earth metal as a sintering aid are mixed to prepare a forming raw material. If necessary, a binder, a surfactant, a pore former, water and the like may further be added. An example where silicon carbide powder is used as the refractory aggregates will be described, but silicon nitride powder or the like may be used. An example of the bonding material producing raw material powder is powder which produces "the bonding material including cordierite and metal Si" by the firing. Examples of the powder include mixed powder of cordierite powder and metal Si powder, mixed powder of cordierite powder and powder which produces metal Si by the firing, mixed powder of cordierite forming raw material powder and the metal Si powder, and mixed powder of the cordierite forming raw material powder and the powder which produces metal Si by the firing. The cordierite forming raw material means a raw material which produces cordierite crystals by the firing, and an example of the cordierite forming raw material is mixed powder including 35.9 mass % of talc, 44.3 mass % of aluminum hydroxide, and 19.8 mass % of silica powder. Additionally, in place of the bonding material producing raw material, the cordierite forming raw material may be used. The cordierite forming raw material means the raw material which produces the cordierite crystals by the firing.

The oxide of the alkali earth metal as the sintering aid is preferably an oxide including at least one metal element selected from a group consisting of Ca, Sr, and Ba, or preferably includes a mixture including two or more types of the oxides.

Examples of the binder to be added to the forming raw material include organic binders such as methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together because suitable shape retainability can be obtained. An amount of the binder to be added to the whole forming raw material is preferably 2 mass % or more and 10 mass % or less.

As the surfactant to be added to the forming raw material, ethylene glycol, dextrin, fatty acid soap, polyalcohol or the like is usable. Only one of these surfactants may be used, or a combination of two or more of them may be used. A ratio of an amount of the surfactant to be added to the whole forming raw material is preferably 2 mass % or less.

There is not any special restriction on the pore former, as long as a portion in which the pore former was present prior to the firing becomes the pores by burning after the firing, and examples of the pore former include graphite, starch, a foamable resin, a water absorbable resin, and silica gel. A ratio of an amount of the pore former to be added to the whole forming raw material is preferably 10 mass % or less. In addition, an average particle diameter of the pore former is preferably 10 µm or more and 30 µm or less. When the average particle diameter of the pore former is smaller than 10 the pores are not sufficiently formed in the fired honeycomb structure sometimes, and when the average particle diameter is larger than 30 µm, an extruding die is clogged with the forming raw material sometimes in a case where the forming raw material is formed into a honeycomb formed body by the extrusion or the like. The average particle diameter of the pore former is a value measured by the laser diffractometry. It is to be noted that when the pore former is the water absorbable resin, the average particle diameter is a value obtained after the water absorbable resin sufficiently absorbs water.

Next, the forming raw material is kneaded to obtain a kneaded material. There is not any special restriction on a method of kneading the forming raw material to obtain the kneaded material, and for example, a kneader, a vacuum pugmill or the like is usable. An amount of the water to be added to the forming raw material is suitably regulated so that the kneaded material which is the forming raw material has such a kneaded material hardness as to be easily formed, but a ratio of the amount to the whole forming raw material is preferably 20 mass % or more and 80 mass % or less.

Furthermore, the kneaded material is extruded to obtain a honeycomb segment formed body. In the extrusion, a die designed to have, for example, desirable honeycomb segment shape, cell shape, partition wall thickness and cell density is preferably used. A material of the die is preferably cemented carbide which is hard to wear away. The honeycomb segment formed body becomes the honeycomb segment after the firing. A thickness, a cell density and the like of partition walls of the honeycomb segment formed body can suitably be determined in accordance with a structure of the honeycomb segment to be prepared by taking, into consideration, shrinkage of the honeycomb segment formed body which occurs when the honeycomb segment formed body is dried and fired.

Next, the obtained honeycomb segment formed body is preferably dried before fired. There is not any special restriction on a drying method, and examples of the method include electromagnetic wave heating systems such as microwave heating drying and high-frequency induction heating drying, and external heating systems such as hot air drying and superheated steam drying. Among these systems, it is preferable that a predetermined amount of water is removed by the electromagnetic wave heating system and then the residual water is removed by the external heating system, because the whole honeycomb segment formed body can quickly and uniformly be dried so that any cracks and the like are not generated. As drying conditions, it is preferable that 30 to 99 mass % of water to an amount of the water before the honeycomb segment formed body is dried is removed by the electromagnetic wave heating system and then the amount of the water is decreased to 3 mass % or less by the external heating system. As the electromagnetic wave heating system, the induction heating drying is preferable, and as the external heating system, the hot air drying is preferable.

Next, when the length of the honeycomb segment formed body in the cell extending direction is longer than a desirable length, both end faces (both end portions) of the honeycomb segment formed body are preferably cut to obtain the desirable length. There is not any special restriction on a cutting method, and an example of the method is a method in which a circular saw cutting machine or the like is used.

Next, the honeycomb segment formed body is fired to prepare the honeycomb segment. The honeycomb segment formed body is preferably calcinated to remove the binder and the like before the firing is performed. The calcination is preferably performed at 200° C. or more and 600° C. or less under the air atmosphere for 0.5 to 20 hours. The firing is preferably performed at 1400° C. or more and 1460° C. or less under a non-oxidizing atmosphere such as nitrogen, argon or the like (an oxygen partial pressure is $10^{-4}$ atmospheric pressure or less) under normal pressure for 1 to 20 hours. Additionally, after the firing, an oxidation treatment may be performed at 1100° C. or more and 1400° C. or less under the air atmosphere (steam may be included) for 1 to 20 hours, for the purpose of improving a durability of the honeycomb segment. It is to be noted that the calcination, firing and oxidation treatment can be performed by using, for example, an electric furnace or a gas furnace.

Here, when the honeycomb structure including plugging portions is prepared, the plugging portions are formed in the obtained honeycomb segment. That is, a plugging material is charged into open ends of predetermined cells among a plurality of cells in a first end face of each obtained honeycomb segment, and open ends of the residual cells in a second end face, to prepare the plugging portions. When the plugging material is charged into the honeycomb segment, the plugging material is first charged into the predetermined cells from the side of one end face (e.g., the first end face) of the honeycomb segment. Afterward, the plugging material is charged into the cells which are not plugged in the one end face, from the side of the other end face (e.g., the second end face). An example of a method of charging the plugging material is a method having a masking step and a press-in step as described as follows.

The masking step is a step of attaching a sheet to the one end face (e.g., the first end face) of the honeycomb segment and making holes at positions superimposed on "the cells in which the plugging portions are to be formed" in the sheet. The press-in step is a step of pressing "an end portion of the honeycomb segment to which the sheet is attached" into a container in which the plugging material is stored to charge, under pressure, the plugging material into the cells of the honeycomb segment. When the plugging material is charged under pressure into the cells of the honeycomb segments, the plugging material passes the holes formed in the sheet and is charged only into the cells communicating with the holes formed in the sheet. A method of charging the plugging material into the cells from the other end face (e.g., the second end face) of the honeycomb segment is preferably a method similar to the abovementioned method of charging the plugging material into the cells from the one end face of the honeycomb segment. In addition, the plugging material may simultaneously be charged into both the end faces of the honeycomb segment.

Next, the plugging material charged into the cells of the honeycomb segment is preferably dried to form the plugging portions, thereby obtaining a plugged honeycomb segment. Additionally, the plugging material may be dried and then fired to more securely fix the plugging material to the honeycomb segment. In addition, the plugging material may be charged into the honeycomb segment formed body before dried or the honeycomb segment formed body after dried, and the plugging material may be fired together with the honeycomb segment formed body before dried or the honeycomb segment formed body after dried.

Next, the respective obtained honeycomb segments are bonded by a bonding material, so that the bonded body of the honeycomb segments can be obtained. The plugging portions may be formed or do not have to be formed in the honeycomb segments. An example of the bonding material which becomes the bonding portion is slurry obtained by adding an additive such as an organic binder, a foamable resin or a dispersing agent to an inorganic material such as inorganic fibers, colloidal silica, clay or silicon carbide particles and further adding water thereto, followed by the kneading.

Next, a circumferential portion of the obtained honeycomb segment bonded body is preferably ground to obtain a desirable shape. In addition, the honeycomb segments are bonded, the circumferential portion of the honeycomb segment bonded body is ground, and then the circumferential wall is preferably disposed in the circumferential portion by use of a circumference coating material. When such a circumferential wall is disposed, there is, for example, an advantage that an outer shape tolerance of the honeycomb structure is made smaller. As the circumference coating material, the same slurry as the slurry prepared as the bonding material may be used, or different slurry may be used. Thus, the honeycomb structure of the present invention can be manufactured, but the manufacturing method of the honeycomb structure is not limited to the abovementioned manufacturing method.

EXAMPLES

Hereinafter, the present invention will specifically be described on the basis of examples, but the present invention is not limited to these examples.

Example 1

As refractory aggregates, silicon carbide (SiC) powder, metal Si powder and oxide producing raw material powder having an average particle diameter of 14 μm and a specific surface area of 4000 $cm^2/cm^3$ were mixed at a mass ratio of 59:14:27 to obtain "mixed powder". As the oxide producing raw material powder, powder containing 45.1 vol % of talc, 32.8 vol % of kaolin and 22.1 vol % of aluminum hydroxide was used. Furthermore, to the above "mixed powder", hydroxypropyl methylcellulose as a binder and starch and a water absorbable resin as pore formers were added and water was also added to obtain a forming raw material. A content of the binder was 7 parts by mass, a content of the pore former was 3 parts by mass and a content of the water was 70 parts by mass, when a content of the mixed powder was 100 parts by mass. Additionally, an average particle diameter of the pore former was 15 μm. In addition, an average particle diameter of talc of an oxide producing raw material was 3 μm, an average particle diameter of kaolin was 1 μm, and an average particle diameter of aluminum hydroxide was 0.2 μm. The average particle diameter is a value measured by laser diffractometry in which SALD3100 manufactured by Shimadzu Corporation is used, and the specific surface area is a value measured by a BET method in which Tristar II3020 manufactured by Shimadzu Corporation is used.

Next, the kneaded material was extruded by using a predetermined die, to obtain 16 honeycomb segment formed bodies in which a cell shape was quadrangular, the whole shape was quadrangular prismatic pillar, a partition wall thickness was 0.3 mm, and a cell density was 46.5 cells/cm$^2$. Next, in each obtained honeycomb segment, a plugging material was charged into open ends of predetermined cells in a first end face and open ends of the residual cells in a second end face to form plugging portions.

Next, each of the honeycomb segment formed bodies was dried by induction drying and further completely dried with a hot air dryer, and afterward, both end faces of the honeycomb segment formed body were cut to prepare the honeycomb segment formed body in a predetermined dimension. Furthermore, the honeycomb segment formed body was fired at 1410 to 1440° C. for five hours. As to the obtained honeycomb segment formed body, porosity (%) of partition walls was measured by a mercury porosimeter (model No.: IV9500) manufactured by Shimadzu Corporation.

Next, the 16 honeycomb segments were bonded by a bonding material, a circumferential portion of thus obtained honeycomb segment bonded body was ground, and then a circumferential wall was disposed on the circumferential portion by use of a circumference coating material. In the circumference coating material and the bonding material, slurry containing 10 mass % of SiC particles, 10 mass % of alumina fibers and 10 mass % of colloidal silica was used.

A honeycomb structure body of the obtained honeycomb structure had a pillar shape in which a diameter (an outer diameter) of a cross section of the honeycomb structure body which was vertical to a cell extending direction was 143.7 mm and a length of the honeycomb structure body in the cell extending direction was 152 mm. A partition wall thickness was 300 μm and a cell density was 46.5 cells/cm$^2$. The cells had a quadrangular shape.

As to the obtained honeycomb structure, there were measured, by a fluorescent X-ray quantitative analysis, a ratio of a mass of metal Si to a mass of silicon carbide and metal Si, a ratio of a mass of an oxide to a mass of an oxide material and silicon carbide, a ratio of a mass of silicon carbide to a mass of the whole porous body, a ratio of the mass of metal Si to the mass of the whole porous body, a ratio of a mass of the oxide material to the mass of the whole porous body, a ratio of a mass of a bonding material to the mass of the whole porous body and a ratio of the mass of the oxide material to the mass of the bonding material.

Table 1 shows the porosity (%) of the partition walls, the ratio of the mass of metal Si to the mass of silicon carbide and metal Si, the ratio of the mass of the oxide to the mass of the oxide material and silicon carbide, the ratio of the mass of silicon carbide to the mass of the whole porous body, the ratio of the mass of metal Si to the mass of the whole porous body, the ratio of the mass of the oxide material to the mass of the whole porous body, the ratio of the mass of the bonding material to the mass of the whole porous body and the ratio of the mass of the oxide material to the mass of the bonding material. It is to be noted that Table 1 shows as follows. The ratio of the mass of metal Si to the mass of silicon carbide and metal Si is shown as "Si (mass %) in (Si+SiC)". The ratio of the mass of the oxide to the mass of the oxide material and silicon carbide is shown as "Oxide (mass %) in (oxide+SiC)". The ratio of the mass of silicon carbide to the mass of the whole porous body is shown as "SiC (mass %) in porous body". The ratio of the mass of metal Si to the mass of the whole porous body is shown as "Si (mass %) in porous body". The ratio of the mass of the oxide material to the mass of the whole porous body is shown as "Oxide (mass %) in porous body". The ratio of the mass of the bonding material to the mass of the whole porous body is shown as "Bonding material (mass %) in porous body". The ratio of the mass of the oxide material to the mass of the bonding material is shown as "Oxide (mass %) in bonding material".

TABLE 1

| | porosity (%) | Si (mass %) in (Si + SiC) | oxide (mass %) in (oxide + SiC) | SiC (mass %) in porous body | Si (mass %) in porous body | oxide (mass %) in porous body | bonding material (mass %) in porous body | oxide (mass %) in bonding material |
|---|---|---|---|---|---|---|---|---|
| Comparative Example 1 | 37.6 | 25 | 3.0 | 73.3 | 24.4 | 2.30 | 26.7 | 8.50 |
| Example 1 | 28.2 | 19 | 32 | 58.6 | 13.8 | 27.6 | 41.4 | 66.7 |
| Example 2 | 27.9 | 25 | 27 | 58.7 | 19.6 | 21.7 | 41.3 | 52.6 |
| Example 3 | 27.0 | 31 | 24 | 56.7 | 25.5 | 17.9 | 43.3 | 41.3 |
| Comparative Example 2 | 28.0 | 42 | 12 | 53.7 | 38.9 | 7.30 | 46.3 | 15.8 |
| Comparative Example 3 | 28.0 | 2.0 | 40 | 58.0 | 1.00 | 39.0 | 40.0 | 97.5 |
| Comparative Example 4 | 24 | 31 | 24 | 56.7 | 25.5 | 17.9 | 43.3 | 41.3 |
| Comparative Example 5 | 73 | 31 | 24 | 56.7 | 25.5 | 17.9 | 43.3 | 41.3 |
| Example 4 | 70 | 31 | 24 | 56.7 | 25.5 | 17.9 | 43.3 | 41.3 |
| Example 5 | 48 | 31 | 24 | 56.7 | 25.5 | 17.9 | 43.3 | 41.3 |
| Comparative Example 6 | 27 | 16 | 12 | 75 | 14.7 | 10.3 | 25 | 41.3 |
| Example 6 | 27 | 35 | 28 | 52 | 28.2 | 19.8 | 48 | 41.3 |
| Comparative Example 7 | 27 | 42 | 34 | 45 | 32.3 | 22.7 | 55 | 41.3 |
| Comparative Example 8 | 27 | 30 | 92 | 8 | 3.5 | 39.8 | 43.3 | 92 |
| Example 7 | 27 | 30 | 75 | 25 | 10.8 | 32.5 | 43.3 | 75 |
| Example 8 | 27 | 30 | 30 | 70 | 30.3 | 13 | 43.3 | 30 |
| Comparative Example 9 | 27 | 30 | 25 | 75 | 32.5 | 10.8 | 43.3 | 25 |

As to the obtained honeycomb structure, "a heat capacity [J/(cc·K)] at 800° C." and "a thermal conductivity [W/(m·K)] at 800° C." were measured by the following methods. Table 2 shows the results. Specifically, the heat capacity and thermal conductivity at 800° C. were measured by a laser flash method thermal constant measuring device (model No.: TC1200RH) manufactured by ULVAC Co. Table 2 shows the results. Table 2 shows "the heat capacity at 800° C." and "the thermal conductivity at 800° C." as "Heat capacity [J/(cc·K)]" and "Thermal conductivity [W/(m·K)]", respectively.

is not shown, but a temperature difference from a maximum temperature $T_{max}$ of Comparative Example 1 is shown on the basis of after-mentioned Comparative Example 1. For example, when a column of $T_{max}$ of one example shows "−150", it is meant that the value of $T_{max}$ is lower than the value of $T_{max}$ of Comparative Example 1 as much as 150° C. Furthermore, when a column of $T_{max}$ of another example shows "50", it is meant that the value of $T_{max}$ is higher than the value of $T_{max}$ of Comparative Example 1 as much as 50° C. In addition, the value of $T_{max}$ of Comparative Example 1 is used as a reference, and hence the value of $T_{max}$ of Comparative Example 1 is shown as "0". Furthermore, as to an example where a value of $T_{max}$ is the same as the value of $T_{max}$ of Comparative Example 1, "0" is also shown. It is to be noted that Table 2 shows "the maximum temperature $T_{max}$ of the honeycomb structure during the PM burning which was measured by the first method" as "Max. temp. (° C.) <burner>". In addition, the table shows "the maximum temperature $T_{max}$ of the honeycomb structure during the PM burning which was measured by the second method" as "Max. temp. (° C.) <engine>". Hereinafter, "the measurement result of the maximum temperature $T_{max}$ of the honeycomb structure during the PM burning by the first method" will simply be referred to as "the measurement result by the first method" sometimes. In addition, "the measurement result of the maximum temperature $T_{max}$ of the honeycomb structure during the PM burning by the second method" will simply be referred to as "the measurement result by the second method" sometimes.

TABLE 2

|  | heat capacity [J/(cc·K)] | thermal conductivity [W/(m·K)] | max. temp. (° C.) <burner> | max. temp. (° C.) <engine> | pressure loss (kPa) | General Evaluation |
|---|---|---|---|---|---|---|
| Comparative Example 1 | 2.21 | 5.1 | 0 | 0 | 15 | failure |
| Example 1 | 2.58 | 6.3 | −150 | −130 | 10 | good |
| Example 2 | 2.54 | 7.0 | −110 | −96.0 | 10 | pass |
| Example 3 | 2.53 | 7.6 | −160 | −139 | 10 | good |
| Comparative Example 2 | 2.28 | 12.3 | — | −25.0 | 11 | failure |
| Comparative Example 3 | 2.68 | 6.0 | — | −60.0 | 12 | failure |
| Comparative Example 4 | 2.55 | 7.7 | 0 | 0.0 | 17 | failure |
| Comparative Example 5 | 2.2 | 3.5 | 50 | 50.0 | 10 | failure |
| Example 4 | 2.3 | 4.9 | −70 | −70.0 | 10 | pass |
| Example 5 | 2.5 | 7 | −90 | −85.0 | 15 | pass |
| Comparative Example 6 | 2.2 | 4.9 | −10 | 0.0 | 17 | failure |
| Example 6 | 2.55 | 7.7 | −100 | −105.0 | 10 | pass |
| Comparative Example 7 | 2.55 | 3.8 | −20 | −10.0 | 18 | failure |
| Comparative Example 8 | 2.5 | 3.5 | 0 | 0 | 18 | failure |
| Example 7 | 2.45 | 7 | −100 | −90 | 10 | pass |
| Example 8 | 2.44 | 7 | −150 | −130 | 10 | good |
| Comparative Example 9 | 2.3 | 3.8 | −10 | −20 | 15 | failure |

(Measurement of Maximum Temperature $T_{max}$ of Honeycomb Structure During PM Burning)

Additionally, as to the obtained honeycomb structure, the maximum temperature $T_{max}$ of the honeycomb structure during PM burning was measured by the following two methods. In the first method, a light oil burner exhaust gas containing PM was allowed to flow, and thereby 8 g of the PM was deposited per liter of a volume of the honeycomb structure. Next, the honeycomb structure in which the PM was deposited was placed in a burner test device in which propane was used as a fuel, and the PM was burnt. Furthermore, the maximum temperature $T_{max}$ of the honeycomb structure during the PM burning was measured by a K-type sheath thermocouple. Additionally, in the second method, a diesel engine exhaust gas containing the PM was allowed to flow, and thereby 8 g of the PM was deposited per liter of the volume of the honeycomb structure. Next, the honeycomb structure in which the PM was deposited was placed in an engine test device having a constitution described as follows, and the PM was burnt. In the engine test device, the PM was burnt by utilizing the exhaust gas discharged from an engine at a temperature of 650° C., to regenerate the honeycomb structure. Furthermore, the maximum temperature $T_{max}$ of the honeycomb structure during the PM burning was measured by the K-type sheath thermocouple. Table 2 shows the measurement results. It is to be noted that as a value of the maximum temperature $T_{max}$, an absolute value (Pressure Loss Measurement)

An exhaust gas discharged from a diesel engine (3.0 liters, a direct injection common rail, and six air cylinders in series) was allowed to flow into the honeycomb structure to trap PM by partition walls of the honeycomb structure so that an amount of the PM deposited to a volume of the honeycomb structure was 4 g/L. Furthermore, in the state where the amount of the PM to be deposited reached 4 g/L, the engine exhaust gas at 200° C. was allowed to flow inside at a flow rate of 3.0 Nm³/min to measure pressures of the honeycomb structure on an inflow end face side and an outflow end face side, and a difference between the pressures was calculated, to obtain a pressure loss (kPa). Table 2 shows the results.

(General Evaluation)

A general evaluation was performed from a measurement result by a first method and a measurement result by a second method in accordance with the following evaluation standards, to judge whether each result was good, pass, or failure. Table 2 shows the results.

Evaluation "good": when the measurement result by the first method is "−150" or less and the measurement result by the second method is "−130" or less, it is judged that the evaluation result is "good".

Evaluation "pass": when the measurement result by the first method is "−70" or less and the measurement result by the second method is "−70" or less, it is judged that the evaluation result is "pass".

Evaluation "failure": when the measurement result by the first method is unmeasurable, when the measurement result by the first method is "−60" or more, or when the measurement result by the second method is "−60" or more, it is judged that the evaluation result is "failure".

Example 2

The procedure of Example 1 was repeated except that "mixed powder" was obtained by mixing silicon carbide (SiC) powder, metal Si and oxide producing raw material powder at a mass ratio of 59:20:21, to prepare a honeycomb structure.

Example 3

The procedure of Example 1 was repeated except that "mixed powder" was obtained by mixing silicon carbide (SiC) powder, metal Si and oxide producing raw material powder at a mass ratio of 56:26:18, to prepare a honeycomb structure.

Comparative Example 1

The procedure of Example 1 was repeated except that "mixed powder" was obtained by mixing silicon carbide (SiC) powder and metal Si at a mass ratio of 73.3:25, to prepare a honeycomb structure. Additionally, in Comparative Example 1, "the mixed powder" was prepared so that oxide producing raw material powder was not included, but when the honeycomb structure was fired, an oxide was produced, and hence a bonding material included an oxide material.

Comparative Example 2

The procedure of Example 1 was repeated except that "mixed powder" was obtained by mixing silicon carbide (SiC) powder, metal Si and oxide producing raw material powder at a mass ratio of 42:12:53.7, to prepare a honeycomb structure. In the honeycomb structure of Comparative Example 2, when a maximum temperature $T_{max}$ of the honeycomb structure during PM burning was measured by a first method, cracks were generated during the measurement, and hence the maximum temperature $T_{max}$ could not be measured.

Comparative Example 3

The procedure of Example 1 was repeated except that "mixed powder" was obtained by mixing silicon carbide (SiC) powder, metal Si and oxide producing raw material powder at a mass ratio of 31:24:56.7, to prepare a honeycomb structure. In the honeycomb structure of Comparative Example 3, when a maximum temperature $T_{max}$ of the honeycomb structure during PM burning was measured by a first method, cracks were generated during the measurement, and hence the maximum temperature $T_{max}$ could not be measured. Additionally, in Comparative Example 3, "the mixed powder" was prepared so that metal silicon was not included, but when the honeycomb structure was fired, metal Si was produced, and hence a bonding material included metal Si.

(Result 1)

As shown in Table 2, honeycomb structures of Examples 1 to 3 could obtain suitable results in evaluations of both of a measurement result by a first method and a measurement result by a second method.

In a honeycomb structure of Comparative Example 1, a ratio of a mass of an oxide material to a mass of a bonding material was smaller than 30 mass %, and both of a heat capacity and a thermal conductivity of the honeycomb structure were therefore small. In consequence, the measurement result by the first method and the measurement result by the second method were not suitable, and hence a result of a general evaluation was failure.

In a honeycomb structure of Comparative Example 2, a ratio of a mass of an oxide material to a mass of a bonding material was smaller than 30 mass %, and hence a heat capacity of the honeycomb structure was small. Therefore, the measurement result by the first method and the measurement result by the second method were not suitable, and hence the result of the general evaluation was failure.

In a honeycomb structure of Comparative Example 3, a ratio of a mass of an oxide material to a mass of a bonding material was larger than 80 mass %, and hence a thermal conductivity of the honeycomb structure was small. Therefore, the measurement result by the first method and the measurement result by the second method were not suitable, and hence the result of the general evaluation was failure.

In addition, a ratio of a mass of a bonding material to a mass of the whole porous body and a ratio of a mass of an oxide material to the mass of the bonding material were set to predetermined values, respectively, and honeycomb structures which were different only in porosity of the porous body constituting partition walls were prepared. These honeycomb structures will be described as Example 4, Example 5, Comparative Example 4, and Comparative Example 5 as follows. As to each of the honeycomb structures of Example 4, Example 5, Comparative Example 4, and Comparative Example 5, the measurement by the first method, the measurement by the second method and the measurement of a pressure loss were also performed. Table 1 and Table 2 show the results in the same manner as in Example 1.

Example 4, Example 5, Comparative Example 4, and Comparative Example 5

The procedure of Example 1 was repeated except that "mixed powder" was prepared so as to obtain such a constitution as shown in Table 1 and a forming raw material was obtained by suitably adding, to the "mixed powder", hydroxypropyl methylcellulose as a binder and starch and a water absorbable resin as pore formers and also suitably adding water, to prepare honeycomb structures.

(Result 2)

In honeycomb structures of Example 4 and Example 5, porosity of a porous body constituting partition walls was 25% or more and 70% or less, both of a heat capacity and a thermal conductivity were therefore large, and suitable results could be obtained in both of a measurement result by a first method and a measurement result by a second method. On the other hand, in a honeycomb structure of Comparative Example 4, porosity of a porous body constituting partition walls was smaller than 25%, and hence a thermal conductivity was large. Additionally, in a honeycomb structure of Comparative Example 5, porosity of a porous body constituting partition walls was larger than 70%, and hence a thermal conductivity was small. In the honeycomb structures of Comparative Example 4 and Comparative Example 5, the measurement result by the first method and the measurement result by the second method were not suitable, and a result of a general evaluation was failure.

In addition, porosity of a porous body constituting partition walls and a ratio of a mass of an oxide material to a mass of a bonding material were set to predetermined values, respectively, and honeycomb structures which were different only in a ratio of the mass of the bonding material to a mass of the whole porous body were prepared. These honeycomb structures will be described as Example 6, Comparative Example 6, and Comparative Example 7 as follows. As to each of the honeycomb structures of Example 6, Comparative Example 6, and Comparative Example 7, the measurement by the first method, the measurement by the second method and the measurement of a pressure loss were also performed. Table 1 and Table 2 show the results in the same manner as in Example 1.

Example 6, Comparative Example 6, and Comparative Example 7

The procedure of Example 1 was repeated except that "mixed powder" was prepared so as to obtain such a constitution as shown in Table 1 and a forming raw material was obtained by suitably adding, to the "mixed powder", hydroxypropyl methylcellulose as a binder and starch and a water absorbable resin as pore formers and also suitably adding water, to prepare honeycomb structures.

(Result 3)

In a honeycomb structure of Example 6, a ratio of a mass of a bonding material to a mass of the whole porous body was 30% or more and 50% or less, both of a heat capacity and a thermal conductivity were therefore large, and suitable results could be obtained in both of a measurement result by a first method and a measurement result by a second method. On the other hand, in a honeycomb structure of Comparative Example 6, a ratio of a mass of a bonding material to a mass of the whole porous body was smaller than 30 mass %, and both of a heat capacity and a thermal conductivity were therefore small. Additionally, in a honeycomb structure of Comparative Example 7, a ratio of a mass of a bonding material to a mass of the whole porous body was larger than 50 mass %, and hence a thermal conductivity was small. In the honeycomb structures of Comparative Example 6 and Comparative Example 7, the measurement result by the first method and the measurement result by the second method were not suitable, and a result of a general evaluation was failure.

Furthermore, a ratio of a mass of a bonding material to a mass of the whole porous body and porosity of a porous body constituting partition walls were set to predetermined values, respectively, and honeycomb structures which were different only in a ratio of the mass of an oxide material to the mass of the bonding material were prepared. These honeycomb structures will be described as Example 7, Example 8, Comparative Example 8, and Comparative Example 9 as follows. As to each of the honeycomb structures of Example 7, Example 8, Comparative Example 8, and Comparative Example 9, the measurement by the first method, the measurement by the second method and the measurement of a pressure loss were also performed. Table 1 and Table 2 show the results in the same manner as in Example 1.

Example 7, Example 8, Comparative Example 8, and Comparative Example 9

The procedure of Example 1 was repeated except that "mixed powder" was prepared so as to obtain such a constitution as shown in Table 1 and a forming raw material was obtained by suitably adding, to the "mixed powder", hydroxypropyl methylcellulose as a binder and starch and a water absorbable resin as pore formers and also suitably adding water, to prepare honeycomb structures.

(Result 4)

In each of honeycomb structures of Example 7 and Example 8, a ratio of a mass of an oxide material to a mass of a bonding material was 30% or more and 80% or less, and both of a heat capacity and a thermal conductivity were therefore large. In consequence, suitable results could be obtained in both of a measurement result by a first method and a measurement result by a second method. On the other hand, in a honeycomb structure of Comparative Example 8, a ratio of a mass of an oxide material to a mass of a bonding material was larger than 80 mass %, and hence a thermal conductivity was small. Additionally, in a honeycomb structure of Comparative Example 9, a ratio of a mass of an oxide material to a mass of a bonding material was smaller than 30 mass %, and hence a thermal conductivity was small. In the honeycomb structures of Comparative Example 8 and Comparative Example 9, the measurement result by the first method and the measurement result by the second method were not suitable, and a result of a general evaluation was failure.

A honeycomb structure of the present invention can be utilized as a filter for purification of an exhaust gas.

DESCRIPTION OF REFERENCE NUMERALS

1: first end face, 3: second end face, 5 and 5b: cell, 5A: predetermined cell, 5B: residual cell, 7 and 7b: partition wall, 9 and 9b: honeycomb structure body, 10 and 10b: circumferential wall, 11 and 11': refractory particles, 12 and 12': pores, 13 and 13': bonding material, 14 and 14': bonding neck portion, 15: segment, 16: outer wall, 17: bonding portion, 19: plugging portion, and 100, 101 and 102: honeycomb structure.

What is claimed is:

1. A honeycomb structure comprising a pillar-shaped honeycomb structure body having partition walls defining a plurality of cells which become through channels for a fluid and extend from a first end face to a second end face,
wherein the partition walls comprise a porous body having refractory aggregates and a bonding material which bonds the refractory aggregates to each other,
the bonding material includes metal silicon and an oxide material,
porosity of the porous body constituting the partition walls is 25% or more and 55% or less,
a ratio of the mass of the bonding material to the mass of the whole porous body is 30 mass % or more and 50 mass % or less, a ratio of the mass of the oxide material to the mass of the bonding material is 30 mass % or more and 80 mass % or less, a ratio of the mass of the oxide material to the mass of the whole porous body is 26 mass % or more and 40 mass % or less, and a thermal conductivity at 800° C. is 5 W/(m·K) or more and 28 W/(m·K) or less.

2. The honeycomb structure according to claim 1, wherein the porosity of the porous body is 25% or more and 32% or less.

3. The honeycomb structure according to claim 2, wherein the oxide material includes, as a main component, an oxide including at least one metal element selected from the group consisting of Al, Si and Mg or a mixture including two or more types of the oxides.

4. The honeycomb structure according to claim 3, wherein a heat capacity at 800° C. is 2.5 J/(cc·K) or more.

5. The honeycomb structure according to claim 2, wherein a heat capacity at 800° C. is 2.5 J/(cc·K) or more.

6. The honeycomb structure according to claim 1, wherein the oxide material includes, as a main component, an oxide including at least one metal element selected from the group consisting of Al, Si and Mg or a mixture including two or more types of the oxides.

7. The honeycomb structure according to claim 6, wherein a heat capacity at 800° C. is 2.5 J/(cc·K) or more.

8. The honeycomb structure according to claim 1, wherein a heat capacity at 800° C. is 2.5 J/(cc·K) or more.

* * * * *